Jan. 6, 1942. G. O. GABRIEL 2,268,982
TUBE REINFORCING MACHINE
Filed Feb. 28, 1939 10 Sheets-Sheet 1

Inventor
GUSTAVE O. GABRIEL
By Francis J. Klempay
Attorney

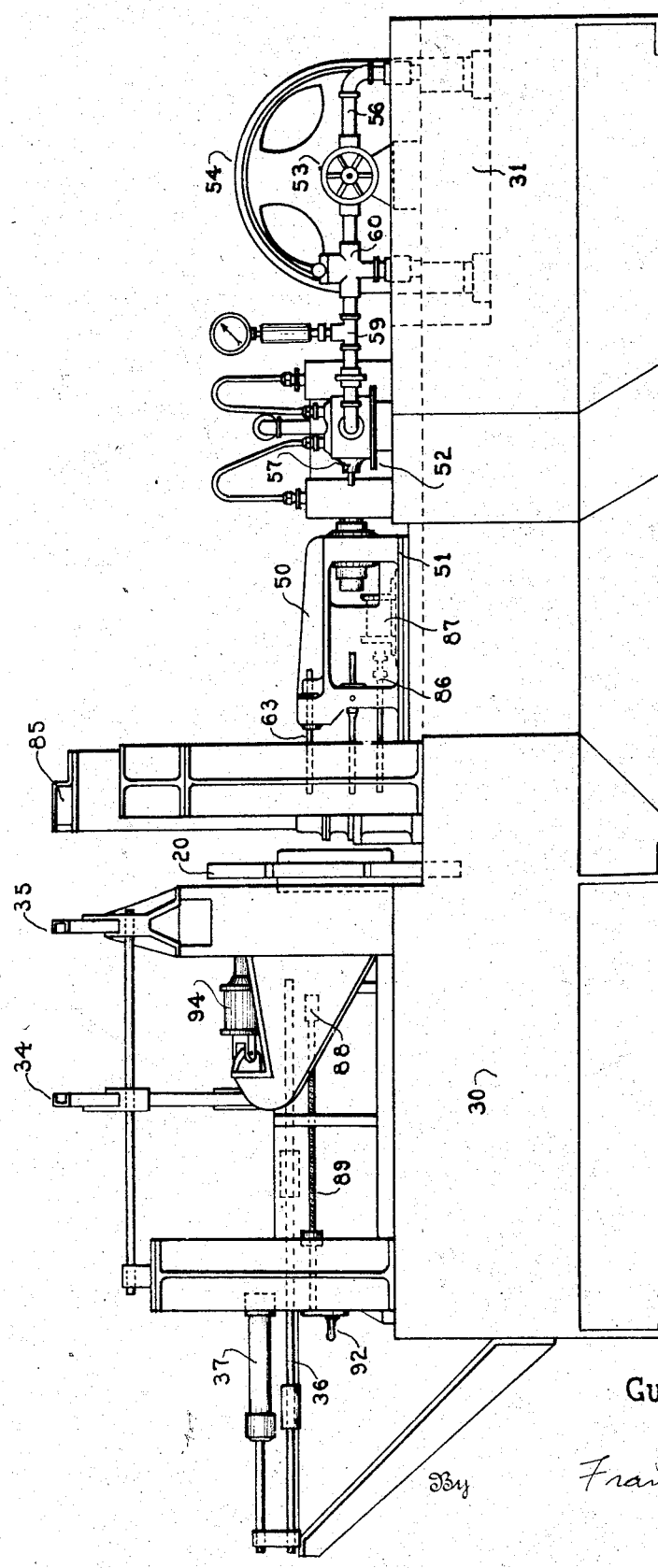

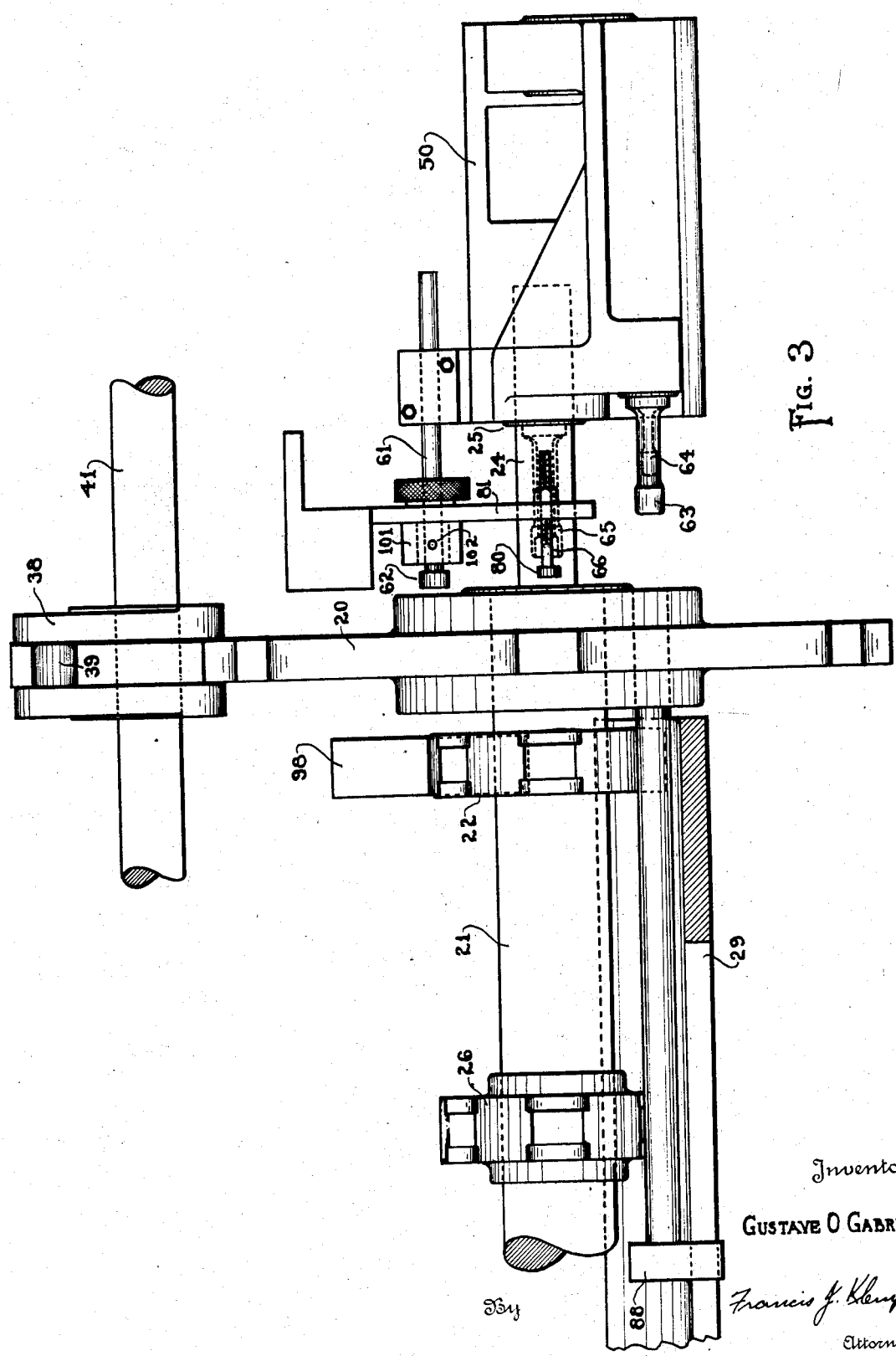

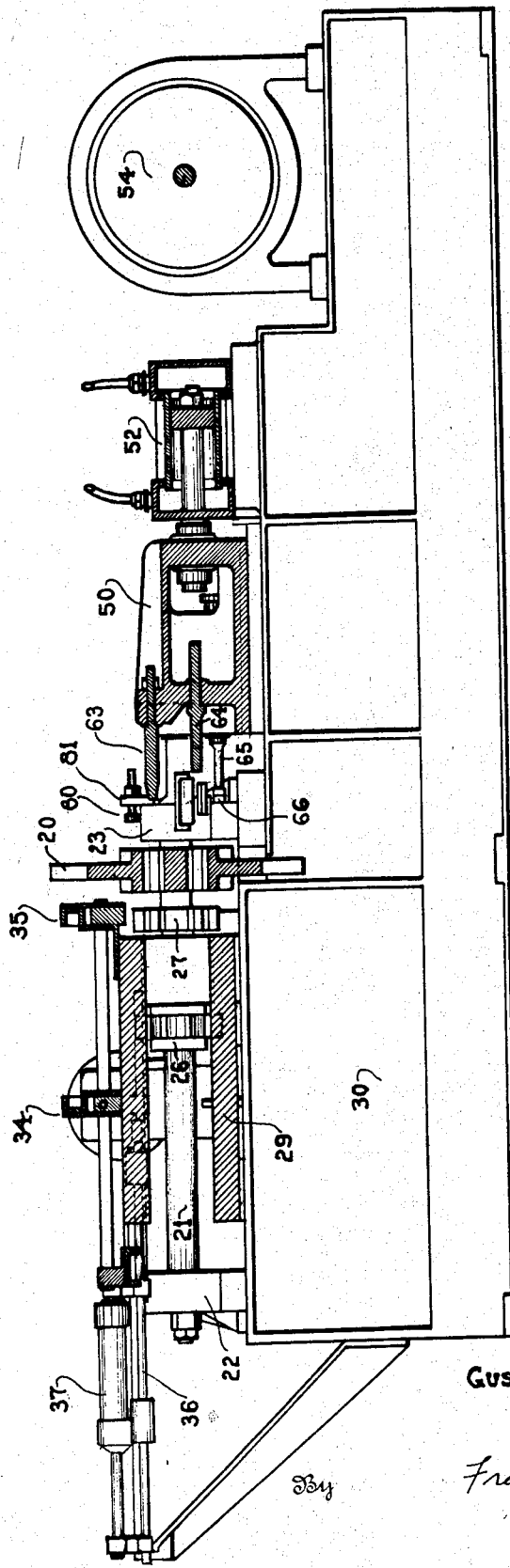

Jan. 6, 1942.  G. O. GABRIEL  2,268,982
TUBE REINFORCING MACHINE
Filed Feb. 28, 1939    10 Sheets-Sheet 5

Inventor
GUSTAVE O. GABRIEL
By Francis J. Klempay
Attorney

Jan. 6, 1942.       G. O. GABRIEL       2,268,982
TUBE REINFORCING MACHINE
Filed Feb. 28, 1939        10 Sheets-Sheet 6

Inventor
GUSTAVE O. GABRIEL
By Francis J. Klempay
Attorney

Jan. 6, 1942.　　　G. O. GABRIEL　　　2,268,982
TUBE REINFORCING MACHINE
Filed Feb. 28, 1939　　　10 Sheets-Sheet 7

Inventor
GUSTAVE O. GABRIEL

By Francis J. Klempay
Attorney

Jan. 6, 1942.  G. O. GABRIEL  2,268,982
TUBE REINFORCING MACHINE
Filed Feb. 28, 1939    10 Sheets-Sheet 8
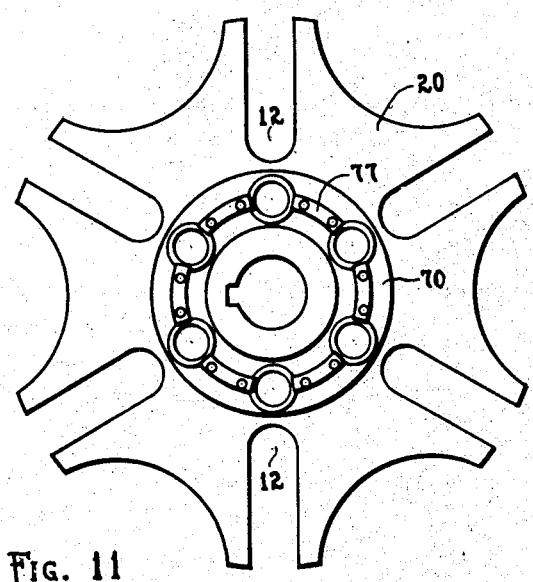
Fig. 11
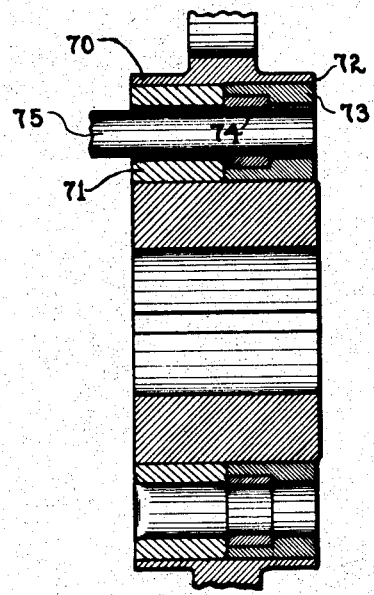
Fig. 12
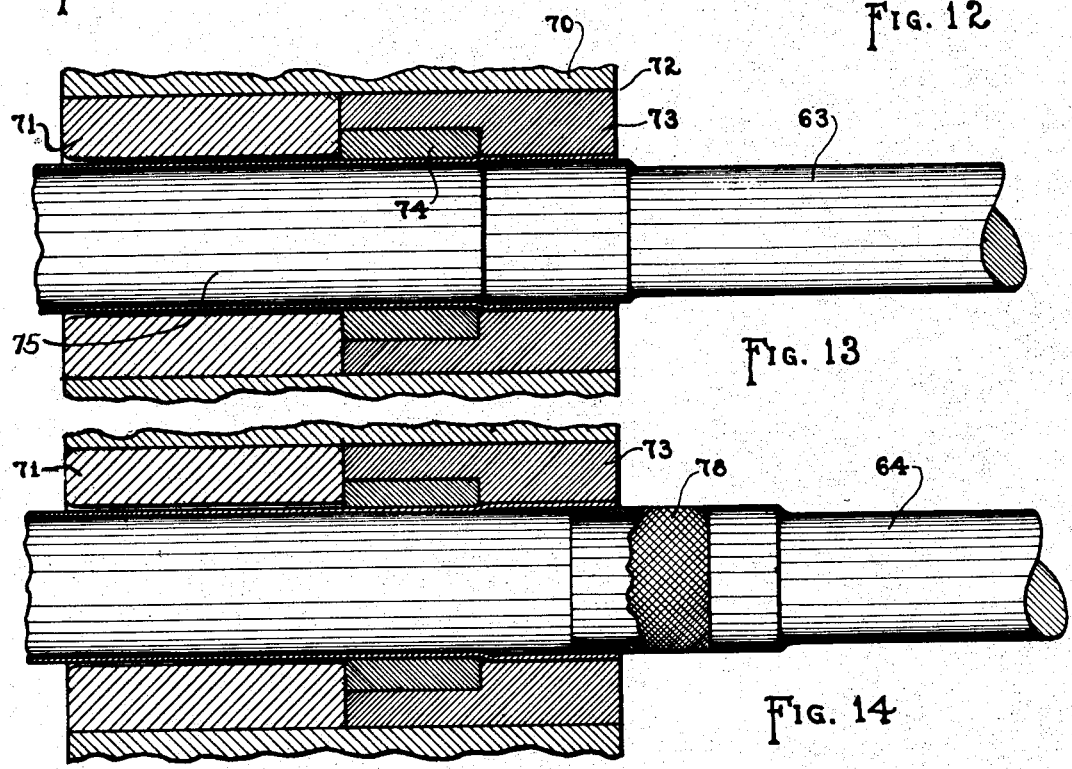
Fig. 13
Fig. 14
Inventor
GUSTAVE O. GABRIEL
By Francis J. Klempay
Attorney Jan. 6, 1942.　　　　G. O. GABRIEL　　　　2,268,982
TUBE REINFORCING MACHINE
Filed Feb. 28, 1939　　　10 Sheets-Sheet 10

Inventor
GUSTAVE O. GABRIEL
By Francis J. Klempay
Attorney

Patented Jan. 6, 1942

2,268,982

UNITED STATES PATENT OFFICE 2,268,982

TUBE REINFORCING MACHINE

Gustave O. Gabriel, Warren, Ohio, assignor to Taylor-Winfield Corporation, Warren, Ohio, a corporation of Ohio Application February 28, 1939, Serial No. 258,989

16 Claims. (Cl. 29—33)

This invention relates to a method and apparatus for reinforcing tubes and more particularly to a method and apparatus for positioning reinforcing inserts in the ends of the tubes to provide in effect thickened walls of the tubes at their ends. The invention is particularly applicable in the preparation of tubular elements preparatory to their further processing and fabrication into structural assemblies such as bicycle frames, motor supports and furniture.

Insertion and use of the tube reinforcements enables much lighter tube sections to be used, eliminates the necessity of certain physical characteristics of the material of the tube, and in cases where the tube is to be end welded provides a welding projection of sufficient mass and desirable properties whereby the assembling operations may be more expeditiously and satisfactorily performed. Inasmuch as the reinforced tube is ordinarily attached to adjacent elements solely by the reinforcement it is obvious that a secure mechanical connection must be effected between the tube and reinforcement and in my process I attain this by first expanding the tube, inserting the reinforcement and thereafter forcing the tube and insert through a constricting die whereby the material of the tube will be swaged onto the reinforcement with great pressure. To enhance the bond between the parts I preferably knurl the outer surface of the insert prior to its insertion in the tube. The process above described may be carried out by the apparatus to be hereinafter described in such manner that a uniform band of great strength may be effected between the tube and reinforcement and the reinforced portion of the tube will be concentric with the remaining part of the tube.

Accordingly, the primary object of the invention is to provide an improved process for the purpose above described which is efficient in operation and which results in a product of improved quality.

Another object of the invention is the provision of an improved process for the purpose described which may be satisfactorily carried out by automatic high speed machinery, thus demonstrating the economy of the process.

A further object of the invention is to provide an improved apparatus for economically carrying out the above described process.

These and other objects and advantages of the invention will become apparent from a consideration of the drawings and the following detailed specification wherein there is disclosed a preferred embodiment of the invention.

In the drawings:

Figure 2 is a front elevational view of the apparatus of Figure 1;

Figure 3 is an enlarged plan view of a portion of the machine;

Figure 4 is a sectional view taken along the line 4—4 of Figure 1;

Figure 1:
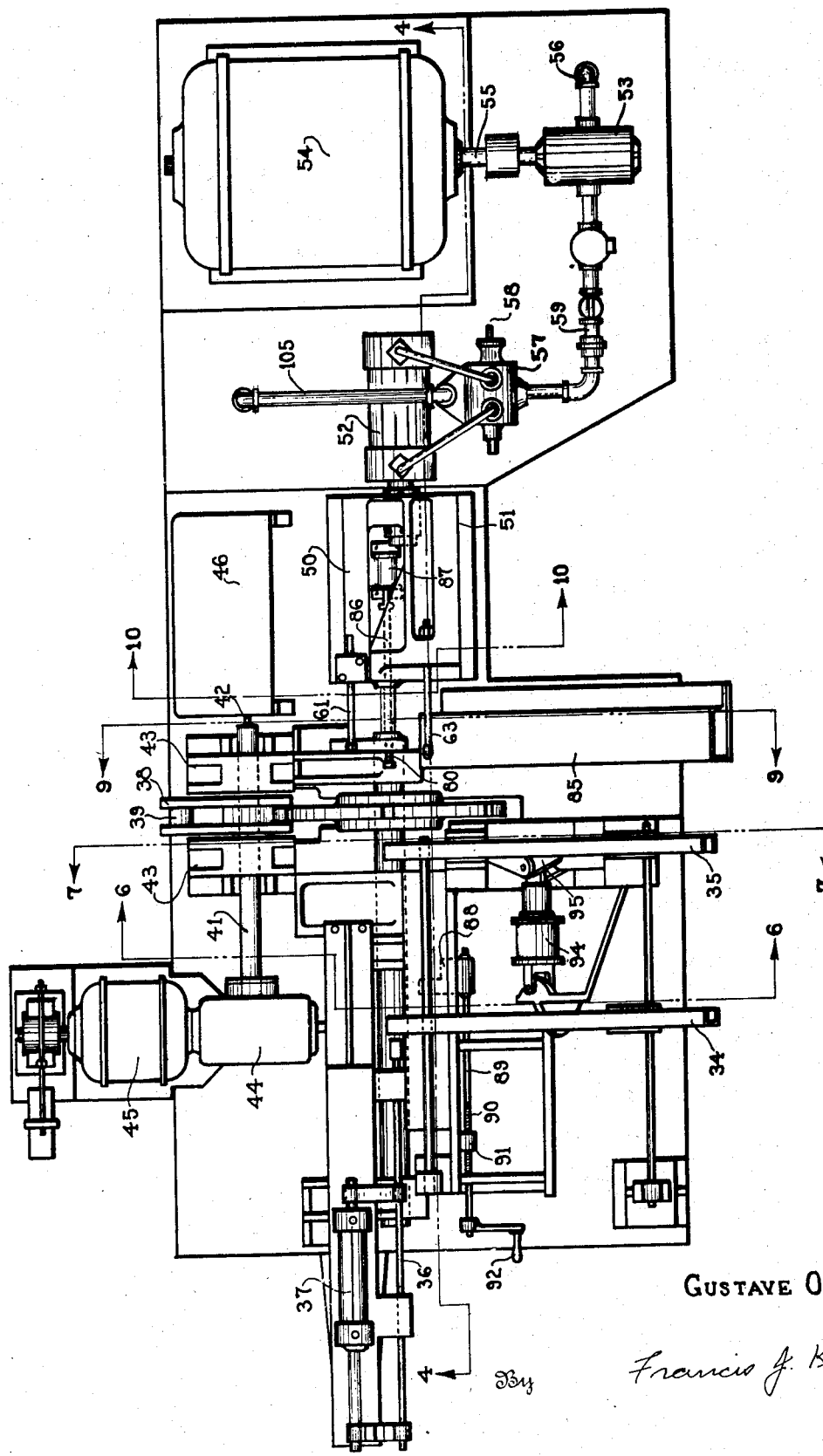
Figure 1 is a plan view of an apparatus constructed in accordance with the principles of my invention.
Figure 10:
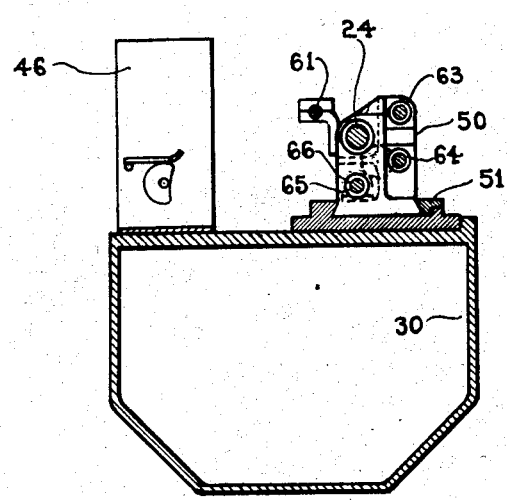
Figure 9:
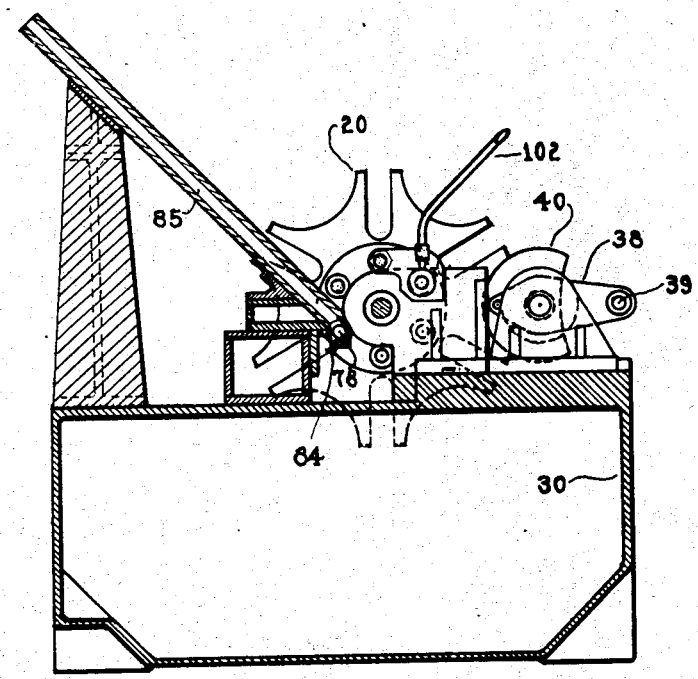
Figure 15:
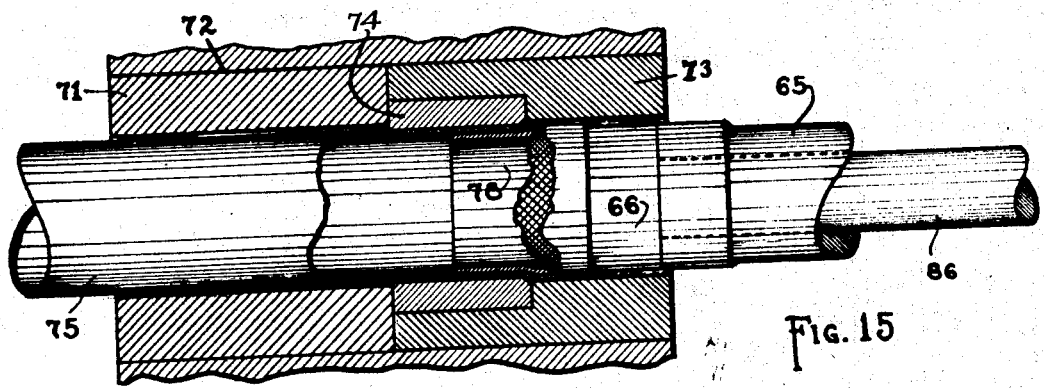
Figure 16:
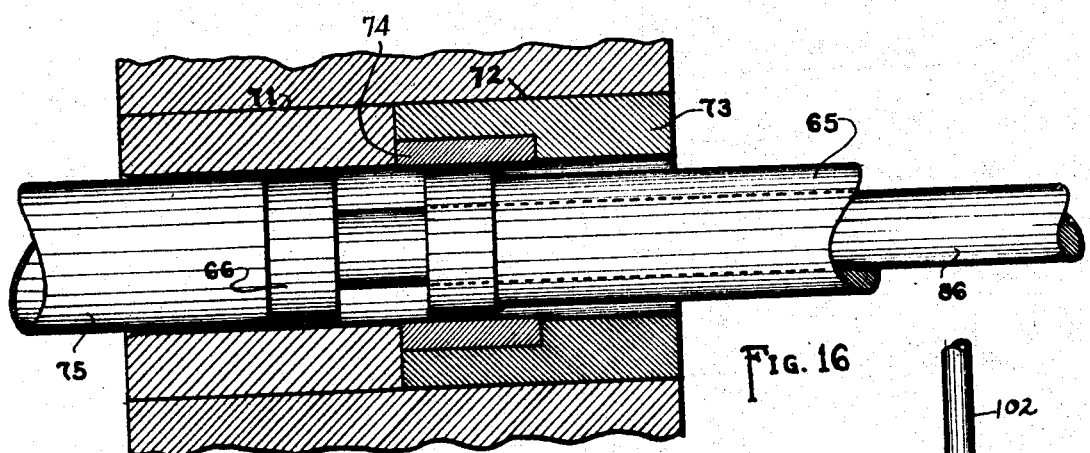
Figure 17:
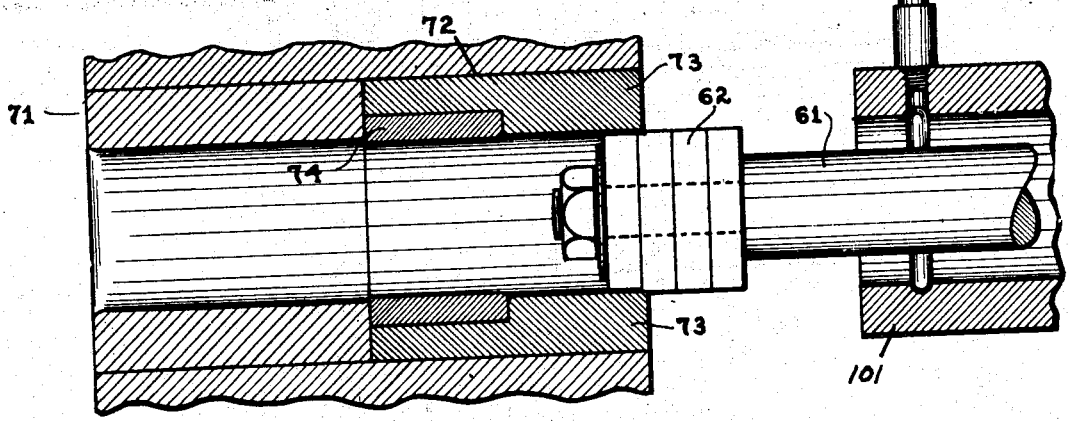

Figures 9 and 10 are sectional views taken along the lines 9 and 10, respectively, of Figure 1;

Figure 11 is a plan view of the die retaining Geneva dial used in the apparatus;

Figure 12 is an enlarged sectional view taken along the line 12—12 of Figure 11;

Figure 13 is an enlarged fragmentary sectional view, through the Geneva dial hub showing the tube to be reinforced in position in the die and the expanding punch in the die;

Figure 14 is a view similar to Figure 13 but showing the reinforcing sleeve partially inserted in the expanded end of the tube;

Figure 15 shows the extruding punch forcing the insert and tube through the restricting portion of the die;

Figure 16 shows the expelling punch forcing the reinforced end of the tube out of the dial hub;

Figure 17 is a sectional view of the die lubricating means; and

Figure 18:
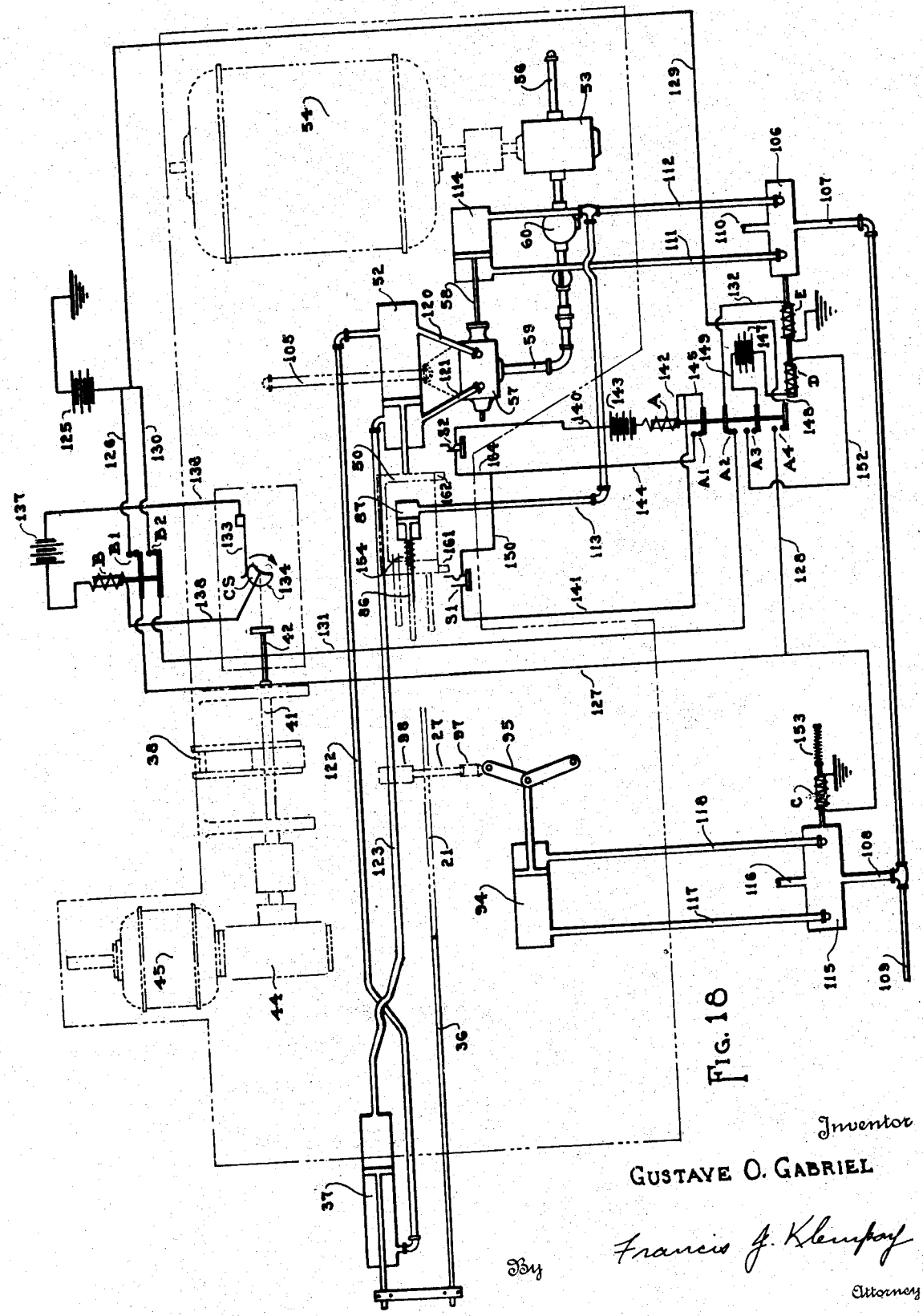

Figure 18 is a schematic view of a simplified control arrangement for the machine.

Referring more particularly to Figures 1 to 4, inclusive, the apparatus of this invention consists generally of an intermittently rotated Geneva dial 20 having a plurality of female dies in its hub portion and an oscillating tool carrying slide 50 adapted to move in synchronism with the dial so as to perform successive operations on the tube ends loaded in the dial as the dial moves to successive indexed positions. The various elements of the machine are supported on a suitable base 30, one portion of which is closed at 31 to provide a reservoir for the fluid utilized in the hydraulic motor used to oscillate the tool slide.

Figure 6:
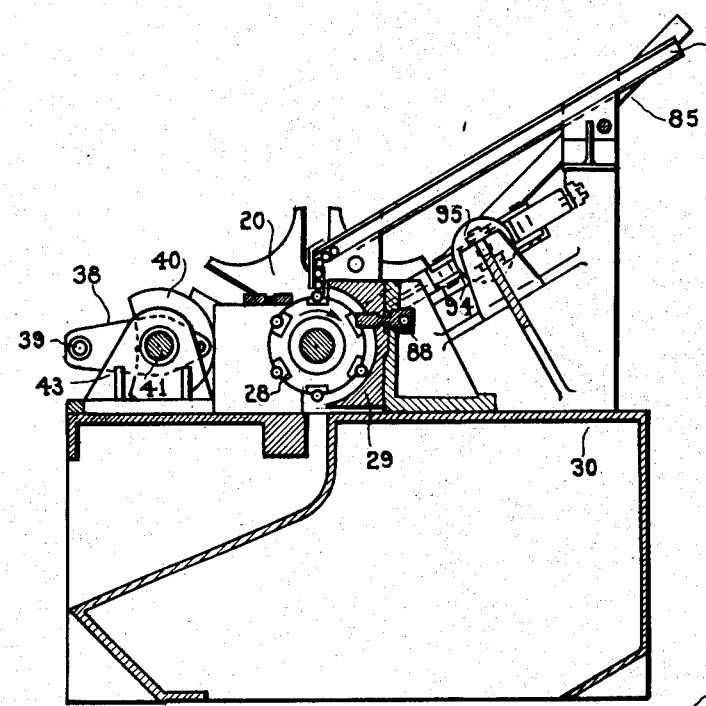
Figure 6 is a sectional view taken along the line 6—6 of Figure 1.

Dial 20 is immediately supported on the shaft 21 which in turn is rotatably supported in the spaced bearing supports 22 and 23 suitably mounted on the base. Shaft 21 is provided with an integral extension 24 to rotatably and slidably fit within a bearing 25 in tool slide 50 thus insuring the axial alignment of the slide and dial. Keyed on shaft 21 at spaced points on the tube feeding side of the Geneva dial are the tube retaining dials 26 and 27 each of which is provided with six equally circumferentially spaced radially extending peripheral slots (see Figures 6 and 7) adapted to interchangeably receive the inserts 28 which inserts are provided with axially extending semi-cylindrical grooves to receive portions of the tubes being processed in the machine. The inserts are interchangeable so as to enable inserts having grooves of varying radii to be used whereby tubes of varying diameters may be accommodated in the machine. As shown in Figure 6, the tubes are retained in the grooves of inserts 28 by a curved shoe 29 which extends substantially about one half of the periphery of the dials 27 and 28.

Figure 5:
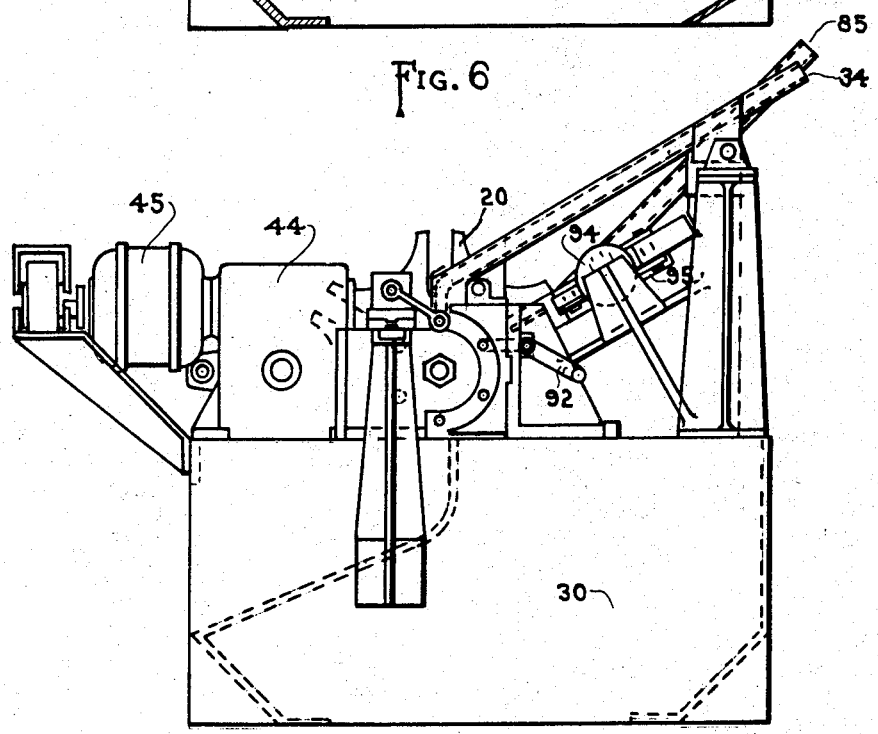
Figure 5 is an end view of the machine.
Figure 7:
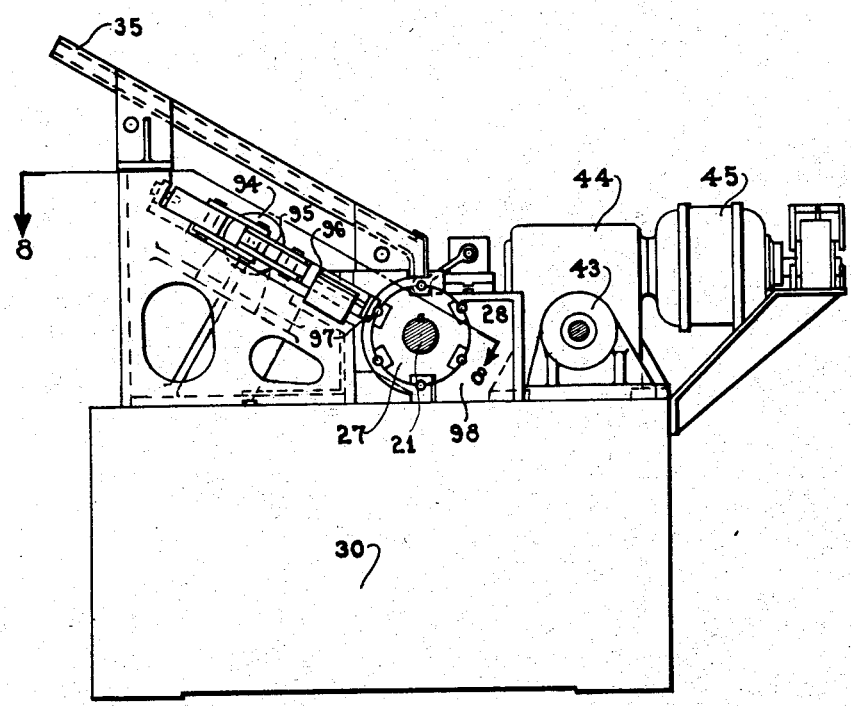
Figure 7 is a sectional view taken along the line 7—7 of Figure 1.

The tubes to be processed are inserted in the magazine slide which consists of a pair of adjustably spaced inwardly channeled members 34 and 35 to receive the ends of the tubes. These members are inclined toward the operating elements of the machine and their lower ends are curved downwardly as shown in Figures 5 to 7 to position the outlet end of the magazine immediately above the uppermost pair of inserts in the dials 27 and 28. It should be observed that the centers of curvature of the grooves in the inserts 28 are axially aligned with the dies in the hub of the Geneva dial and it should therefore be apparent that as the tube drops into the uppermost inserts it is coaxial with the uppermost die in the said hub. Referring now to Figures 1 and 2 the tubes are moved axially into the dies after they drop into the uppermost inserts by the push rod 36 which is operated simultaneously with the tool slide 50 by the hydraulic cylinder 37.

The Geneva dial 20 is intermittently rotated by the driving gear generally indicated at 38 which in accordance with usual practice consists of a driving pin 39 to engage the radial slots of the dial and a curved retaining surface 40 to alternately slidably engage the curved peripheral recesses of the dial. Gear 38 is carried and driven by shaft 41 which is journaled in bearings 43 and driven by motor 45 through the speed reducer 44. Shaft 41 is provided with an extension 42 extending into the switch box 46 for the purpose of operating a synchronizing switch to be hereinafter fully described.

Slidably mounted in the guides 51 is the tool slide 50 which is moved back and forth by the hydraulic cylinder 52 which receives fluid under pressure from the pump 53 driven by motor 54 through shaft 55. The inlet of the pump 53 is connected with the reservoir 31 by means of the conduit 56 and its outlet is connected with a valve 57 by means of the conduit 59. A pressure relief valve 60 is inserted in conduit 59 and is provided with a discharge into reservoir 31 for the purpose of diverting the flow of fluid into the reservoir when the piston in cylinder 52 has reached the end of its stroke. The function of valve 57 which is operated by a rod 58 is to reverse the direction of flow of the fluid to cylinder 52 and thus control the movement of the tool slide 50. The latter element carries a rod 61 having a die lubricating swab 62 at its outer end, a tube expanding punch 63, a reinforcement inserting punch 64, and a composite tube extruding and expelling punch 65—66. These tools are evenly circumferentially spaced about the axis of shaft 24 and are equidistant from the said axis and their radial and circumferential distribution is identical with that of the dies in the hub of dial 20. The drive gear 38 of the Geneva mechanism is so positioned that in any indexed position of the dial, the longitudinal axis of each of the tools is accurately aligned with axis of one of the said dies.

Referring now more particularly to Figures 11, 12 and 13 of the drawings, the dial 20 is provided with a hub portion 70 having six equally spaced bores 72 for the reception of dies now to be described. In each bore there is positioned a guiding die 71 having a rounded outer edge to facilitate entry of the tubes and a working die consisting of a tool steel ring 73 having a working insert 74 of tungsten-carbide or boron-carbide material. Inserts 74 have internal diameters slightly smaller than the internal diameters of the remaining portions of rings 73. The dies are removably secured in the bores 72 by suitable retaining lugs 77 fastened in the end faces of the hub 70 for the purpose of enabling dies of varying diameters to be used whereby tubes of different diameters may be processed in the machine. The diameter of the expanding punch 63 is so chosen in relation to the internal diameter of the die ring 73 and the thickness of the tube wall that the tube is expanded uniformly in all directions thus insuring the concentricity of the expanded portion relative to the remaining portion of the tube irrespective of variations in the thickness of the tube wall due to welding flash and other causes.

In its first or uppermost position, the tube 75 is inserted in its die by the cylinder 37 as explained above, its forward movement being limited by the position of the adjustable stop 80 carried by a supporting member 81 fixed in relation to the base of the machine. After movement of the dial 20 from one indexed position to another the tube is then opposite the expanding punch which upon forward movement expands the portion of the tube forwardly of the insert 74 in the manner shown in Figure 13. In its next position the expanded tube is opposite the reinforcing insert punch 64 which upon forward movement carries an insert 78 resting on shelf 84 into the expanded end of the tube as shown in Figure 14. Inserts 78 drop onto the shelf 84 by gravity from the inclined magazine 85. In the fourth position of the tube the composite extruding and expelling punch 65—66 forces the expanded end of the tube 75 with its insert through the constricting die member 74 thereby swaging the metal of the tube into intimate contact with the outer surface of the reinforcing insert which surface, as stated above, is preferably knurled to enhance the bond between the parts. The internal diameter of die member 74 is substantially that of the tube and therefore the completed reinforced tube is of uniform diameter. To expel the tube from the dial hub upon completion of the extrusion process, the punch member 65 is longitudinally bored, as shown in Figures 15 and 16, to receive the rod 86 which carries the punch member 66 and which is actuated by an auxiliary cylinder 87 mounted on and carried with the tool slide 50. The stroke of cylinder 87 is insufficient to move punch member 66 to the opposite face of hub 71 when the tool slide is in its inward position thus expelling the reinforced tube from the dial.

Figure 8:
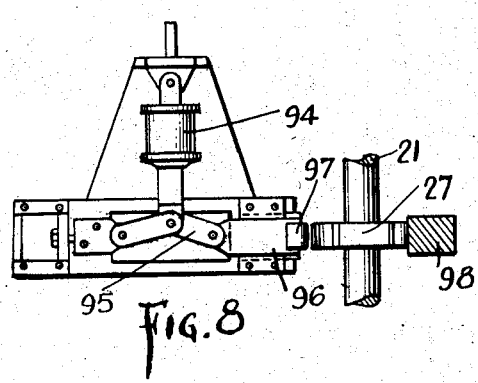
Figure 8 is a plan view of the tube clamping device shown in elevation in Figure 7.

To prevent the expanding punch 63 from forcing the tube back through the die in case clamp 97 slips I provide an adjustable stop 88 which as shown in Figure 6 is provided with an extended portion in alignment with the axis of second tube positioned against which the end of the tube abuts when the tube moves to this position. Stop 88 is slidably mounted in a slot in shoe 29 and is moved and held in position by the rod 89 having a threaded portion 90 to cooperate with a fixed threaded member 91. Rod 89 is rotated by a crank 92 and it is apparent that rotation of the rod results in sliding movement of the stop. To prevent buckling or movement of the tube during the expanding operation, the tube in its expanding position is securely clamped adjacent the dial 20 by the cylinder 94 which acting through the toggle 95 and slide 96 (see Figs. 7 and 8) forces a clamp member 97 into engagement with the tube at a point coincident with the clamping dial 27. To oppose the thrust exerted by the toggle and clamp, I provide a thrust member 98 on the opposite side of the dial 27 which thrust member is provided with a cylindrical bearing surface closely fitting the outer periphery of the dial 27 whereby deflection of the shaft 21 is prevented. It is thus made apparent that the tube in its second or expanding position is securely held against movement by a stop engaging its end by a clamp engaging its side wall at a position adjacent the Geneva dial 20 and not far removed from the expanding tool and die. Movement of the tube during the expanding operation is thus prevented.

As shown more clearly in Figure 3, the die lubricating means consists of a swab 62, preferably of felt, carried by the rod 61 on slide 50 and a chambered block 101 attached to the fixed support 81. A tube 102 is adapted to supply a measured flow of lubricant from any suitable source to the chamber within member 101 and as the swab 62 oscillates between the chamber and the adjacent die the required amount of lubricant will be carried into the die. It should be observed that when the dies are in the position opposite the swab 62 and in the next preceding position they are empty as the reinforced tubes are expelled from the dial at the fourth or lowermost tube position.

From the above description it should be apparent that a number of tubes are simultaneously acted on at each forward stroke of the tool slide 50 and that in the normal operation of the machine three tubes are always in the dial. At each stop of the dial one tube is inserted, one is expanded, an insert is put in a third, and the fourth is extruded and expelled. The apparatus thus far described is designed specifically for automatic operation and in Figure 18 I illustrate, diagrammatically, a simplified control arrangement which enables the machine to operate in such manner.

Referring now to Figure 18 wherein similar reference numerals as used in previous figures designate like parts and wherein the various mechanical parts of the machine are shown in their correct relative positions, the control is shown in the condition it assumes immediately after the gear 38 has moved the dial 20 to one of its indexed positions. The tool slide 50 is moving inwardly toward the dial and by means of the connecting conduits 122 and 123 the cylinder 37 is simultaneously moving the rod 36 toward the dial to insert a tube into the uppermost die of the dial. As the tube slide 50 reaches the end of its stroke, the normally open limit switch S1 is closed by engagement with the lug 161 carried by the slide 50 thus energizing switch solenoid A through the circuit-power source 143, conductor 140, normally closed limit switch S2, conductors 164, 150, switch S1, conductors 141, 142, solenoid A and to power source 143. Energization of solenoid A closes the normally open contacts A1, A2 and A4 and opens normally closed contacts A2. Opening of contacts A2 de-energizes solenoid E which has operated valve 106 to allow fluid under pressure coming through conduit 107 from a suitable source 109 to be diverted through conduit 112 to the right of piston in cylinder 114, moving the piston to the left and operating valve 57 in such manner that fluid under pressure coming from pump 53 was caused to flow through conduit 120 into the right side of cylinder 52 to move the tool slide toward the dial 20. The closing of contacts A2 energizes solenoid D through the circuit—A3, conductor 152, solenoid D, conductor 148, power source 147, conductor 149 and back to A3. This reverses valve 106—connecting conduit 112 with exhaust 110 and supply conduit 107 with conduit 111 which reverses the position of the piston in cylinder 114 and consequently the valve 57 thereby connecting conduit 120 with the conduit 105 which discharges into reservoir 31 and the conduit 121 with the outlet 59 of pump 53 whereby fluid under pressure will be caused to flow to the left side of cylinder 52 to move tool slide 50 away from the dial 20 and to simultaneously move push rod 36 away from the other side of the dial.

As solenoid A is energized by the closing of S1 a holding circuit for this solenoid consisting of power source 143, conductor 140, switch S2, conductors 164, 144, contacts A1, conductors 145, 142, solenoid A and back to power source 143, is established which holding circuit insures the energization of solenoid D until the tool slide 50 is returned and the limit switch S2 opened by engagement with lug 162. As the tool slide 50 is moving back to its initial outer position the cam switch CS which consists of a conducting cam member 134 carried and rotated by the Geneva drive gear shaft 41 through extension 42 and the fixed contact 133 is opened which breaks the normally closed circuit—power course 137, solenoid B, conductor 138, switch CS, conductor 136 and back to power source 137. Deenergization of solenoid B opens the normally closed contacts B1 and B2 the first of which, when closed, establishes the circuit—ground, power source 125, conductor 126, contacts B1, conductor 127, solenoid C and back to ground. Energization of solenoid C operates valve 115 in such manner that fluid under pressure coming from source 109 through conduit 108 is caused to flow through conduit 117 to the left side of the cylinder 94 whereby pressure will be applied against toggle 95 and tube clamp 97. To insure actuation of the tube clamp 97 until the expanding punch is withdrawn from the tube a holding circuit for solenoid C is established by ground, solenoid C, conductors 127, 128, contacts A4, conductor 129, power source 125 and ground, which remains in effect until limit switch S2 is opened when solenoid A is deenergized and contacts A4 opened.

Cam switch CS through solenoid B and contacts B2 controls the energization of solenoid E by means of the circuit ground, power source 125, conductor 130, contacts B2, conductor 131, contacts A2, conductor 132, solenoid E and ground. Thus solenoid E which controls the inward movement of the tool slide 50 cannot be energized until cam switch CS is closed and the member 134 of switch CS is so oriented in relation to the drive gear 38 that contact is always broken when drive gear 38 is moving the dial from one indexed position to another thus preventing forward movement of the tool slide until the dial has reached its next indexed position. If desired, a suitable safety limit switch (not shown) actuated by the tool slide 50 may be used in conjunction with a cam switch on shaft 42 to stop the Geneva gear driving motor 45 in case the tool slide has not reached its outer limiting position before the gear 38 has reached its dial moving sector. Various other safety features such as means to prevent rotation of the dial unless the tubes are properly loaded therein, means to prevent operation of the machine unless a sufficient pressure is available in conduits 59 and 109 and a supply of inserts are in the magazine, and means to insure the stopping of the dial at an indexed position when the machine is shut down are in practice incorporated in the machine but as these features are not essential to a clear understanding of the invention they have been omitted for the sake of brevity and clearness.

Auxiliary cylinder 87 carried by tool slide 50 to actuate the expelling punch 66 (Figure 16) is supplied with fluid pressure from valve 106 by means of conduits 112 and 113 and therefore pressure is applied to cylinder 81 simultaneously with the application of pressure to the right side of servo-motor 114 which condition actuates valve 57 to cause the tool slide to move inwardly. In practice air is preferably used as the motive fluid for motors 114, 87 and 94 and therefore the piston in cylinder 87 will move with a quick action after the composite punch 66—65 has completed the extrusion of the tube through the die. The piston is returned by a suitable spring 154.

Solenoid C actuates valve 115 in such manner that fluid pressure is admitted to the left side of cylinder 94 upon its energization. Upon de-energization of solenoid C a suitable spring 153, may be used to reverse valve 115 and return the piston in cylinder 94.

In normal operation, the tool slide 50 will have returned and the limit switch S2 will be opened while cam switch CS is open and all the solenoids A, B, C, D and E will then be de-energized. Tool slide 50, push rod 36, expelling punch 66 and tube clamp 97 will be in their retracted positions and the dial 20 may be moved to its next successive indexed position. The tube previously inserted will be moved to the tube expanding position, the tube previously expanded will be moved to the reinforcement inserting position, the tube in which the reinforcement was previously inserted will be moved to the extruding and expelling position. Upon completion of the indexing movement, solenoid B circuit will be reestablished by contact between 133 and 134 closing contacts B1 and B2, thus energizing solenoids C and E which results in the actuation of clamp 37 and the slightly delayed inward movement of tool slide 50 and push rod 36 thus completing the cycle of operation described above.

The above specifically described embodiment of my invention should be considered as illustrative only, as obviously many changes may be made therein without departing from the spirit or scope of my invention.

What I claim is:

1. A tube reinforcing machine comprising means to support the tubes being worked on and to move the same to successive indexed operating positions, said means including a die through which said tubes are adapted to project, means at one of said positions to expand the projecting ends of said tubes, means at another of said positions to position reinforcing inserts within the expanded ends of said tubes, and means at a third of said positions to extrude said expanded tube ends with the contained reinforcing inserts through said die.

2. A tube reinforcing machine comprising means to support the tubes being worked on and to move the same to successive indexed operating positions, said means including a movable member having a plurality of bores for the partial reception of said tubes, a die in each of said bores through which said tubes are adapted to project, means at one of said positions to expand the projecting ends of said tubes, means at another of said positions to position reinforcing inserts within the expanded ends of said tubes, and means at a third of said positions to extrude said expanded tube ends with the contained reinforcing inserts through said die.

3. A tube reinforcing machine comprising a rotatable shaft, a member having a hub portion mounted on said shaft, a plurality of equally and circumferentially spaced bores extending through said portion equally spaced from and parallel with the axis of rotation of said shaft, a die in each of said bores, means to feed tubes into said bores with their ends extending outwardly beyond said dies, means to intermittently rotate said shaft from one indexed position to another through an angle equal to the angular distance between said bores, means at one of said indexed positions to expand the end of the adjacent tube, means at the next succeeding indexed position to position a reinforcing insert in the expanded end of the adjacent tube, and means at the third indexed position to extrude the expanded end with the contained reinforcing insert through the adjacent die and bore.

4. A tube reinforcing machine comprising a rotatable member having a plurality of bores equally spaced from and parallel with the axis of rotation of said member, said bores being equally circumferentially spaced, a die in each of said bores, means to feed tubes into said bores with their ends extending outwardly beyond said dies, means to rotate said member from one indexed position to another through an angle equal to the angular distance between said bores, means at one of said indexed positions to expand the end of the adjacent tube, means at the next succeeding indexed position to position a reinforcing insert in the expanded end of the adjacent tube, and means at the third indexed position to extrude the expanded end with the contained reinforcing insert through the adjacent die and bore.

5. A tube reinforcing machine comprising a rotatable shaft having an end projecting beyond its point of support, means on said shaft adapted to support a plurality of dies each having its axis of pass equally radially spaced from and parallel with the axis of rotation of said shaft, said die axes being equally spaced from each other, a tool slide having a journal to receive the extended end of said shaft and adapted to reciprocate towards and away from said dies, means on said slide to work on tubes extending through said dies in successive indexed positions of said die supporting means to progressively expand, provide with a reinforcing insert and extrude through one of said dies each of the tubes passed through the machine.

6. A tube reinforcing machine comprising a rotatable shaft having an end projecting beyond its point of support, means on said shaft to support a plurality of tubes being operated on parallel with and equally radially spaced from the axis of rotation of said shaft, said supporting means supporting said tubes in equal circumferential relation, a tool slide having a journal to receive the extended end of said shaft and adapted to reciprocate towards and away from the adjacent ends of said tubes, means on said slide to operate on said tubes in progressive relation to provide the end portions of said tubes with a fixed reinforcing insert.

7. A tube reinforcing machine comprising in combination a rotatable shaft, a Geneva dial on said shaft, a Geneva drive for said dial to move said dial intermittently through equal angular distances from one indexed position to another, said dial being provided with a thickened hub portion having a plurality of bores therethrough extending parallel with the axis of rotation of said dial, said bores being equally spaced from said axis and from each other, a die in each of said bores, a slide movable parallel with said axis and adapted to reciprocate towards and away from said dies, a plurality of operating elements carried on said slide in alignment with certain of said bores when the dial is in indexed position, said elements including means to expand the tube ends extending through said dies, means to position reinforcing inserts in the expanded tube ends and means to extrude the expanded ends containing the inserts through said dies.

8. A tube reinforcing machine comprising in combination a die, means to support a tube being operated on with its end extending through said die, means to expand the extended end of said tube, means to position a reinforcing insert within said expanded end, and means to extrude the expanded end of said tube containing the reinforcing insert through said die whereby the material of said tube will be swaged over the insert to securely hold the insert in position in said tube.

9. The method of reinforcing a portion of a tube which consists of expanding said portion against a retaining surface by an expanding punch concentric with said surface, positioning a reinforcing insert in said expanded portion, and extruding said expanded portion containing said insert through a restricting die concentric with said surface.

10. Tube reinforcing apparatus comprising in combination, a supporting block, a bore through said block for the reception of a portion of a tube, a shoulder in said bore, a die ring in said bore abutting said shoulder, a shoulder in the bore of said ring, and a die having pass dimensions less than any pass dimensions of the ring positioned between said shoulders.

11. A tube reinforcing machine comprising a movable magazine for the support of a plurality of tubes being worked on, said magazine including a plurality of dies through which portions of said tubes are adapted to extend, means to move said tube portions through said dies, means to hold said tubes in position in said dies, and means to simultaneously expand the said portion of one of said tubes, position a reinforcing insert in the expanded portion of another of said tubes, and to extrude the expanded portion containing an insert of a third tube through one of said dies.

12. A tube reinforcing machine comprising a magazine for the support of a plurality of tubes being operated on, means to intermittently move said magazine in equal increments, a die on said magazine for each of said tubes, a tool assembly including a tube expanding punch, a reinforcing insert positioning punch and a tube extruding punch positioned in operative relation to said dies, and means to move said assembly relative to said extending tubes whereby each of the tools will simultaneously perform its respective function on the tubes upon cessation of movement of said magazine.

13. A tube reinforcing machine comprising a magazine for the support of a plurality of tubes to be worked on, a tool assembly including a plurality of tools to perform progressive operations on said tubes, and means to intermittently move said magazine and assembly relative to one another whereby each tool will perform its operation on succeeding tubes, one of said tools being operative to position a reinforcing insert in the tubes.

14. A tube reinforcing machine comprising a magazine for the support of a plurality of tubes being operated on, a die on said magazine for each of said tubes, a tool assembly including a plurality of tools to perform progressive operations on the tubes within said magazine, a die lubricating means carried with said assembly, and means to intermittently move said assembly relatively to said magazine whereby the tools will perform their functions and one of said dies will be simultaneously lubricated.

15. A tube reinforcing machine comprising means to support the tubes being worked on and to move the same to successive indexed operating positions, said means including a die through which said tubes are adapted to project, means at certain of said positions to expand the projecting ends of said tubes and to position reinforcing inserts therein, and means at another of said positions to extrude said expanded tube ends with the contained reinforcing inserts through said die.

16. A tube reinforcing machine comprising in combination a die, means to support a tube being operated on with its ends extending through said die, means to expand the extended end of said tube and to position a reinforcing insert therein, and means to extrude the expanded end of said tube containing the reinforcing insert through said die whereby the material of said tube will be swaged over the insert to securely hold the insert in position in said tube.

GUSTAVE O. GABRIEL.